(12) United States Patent
Eldar et al.

(10) Patent No.: US 7,751,469 B2
(45) Date of Patent: Jul. 6, 2010

(54) CORRELATION SHAPING MATCHED FILTER RECEIVER

(75) Inventors: Yonina C. Eldar, Cambridge, MA (US); Alan V. Oppenheim, Lexington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 398 days.

(21) Appl. No.: 09/788,890

(22) Filed: Feb. 20, 2001

(65) Prior Publication Data

US 2002/0146066 A1  Oct. 10, 2002

(51) Int. Cl.
*H04B 1/707* (2006.01)
(52) U.S. Cl. ...................................................... 375/152
(58) Field of Classification Search .................. 375/144, 375/152, 147, 150, 316, 324, 325, 130
See application file for complete search history.

(56) References Cited

U.S. PATENT DOCUMENTS

| | | | |
|---|---|---|---|
| 3,668,702 A | 6/1972 | Jones | |
| 3,879,664 A * | 4/1975 | Monsen | 375/232 |
| 3,908,088 A | 9/1975 | Gutleber | |
| 4,044,241 A | 8/1977 | Hatley | |
| 4,779,266 A | 10/1988 | Chung et al. | 370/93 |
| 4,806,939 A | 2/1989 | Ward et al. | 342/378 |
| 4,944,036 A * | 7/1990 | Hyatt | 367/43 |
| 5,210,770 A * | 5/1993 | Rice | 375/142 |
| 5,285,480 A | 2/1994 | Chennakeshu et al. | |
| 5,303,258 A * | 4/1994 | Nakamura | 375/142 |
| 5,343,496 A | 8/1994 | Honig et al. | 375/1 |
| 5,381,154 A | 1/1995 | Guerci | |
| 5,506,861 A * | 4/1996 | Bottomley | 370/441 |
| 5,513,215 A | 4/1996 | Marchetto et al. | |
| 5,761,237 A | 6/1998 | Petersen et al. | 375/200 |
| 5,784,415 A | 7/1998 | Chevillat et al. | |
| 5,790,537 A | 8/1998 | Yoon et al. | |
| 5,790,588 A | 8/1998 | Fukawa et al. | |
| 5,850,414 A * | 12/1998 | Miyajima | 375/150 |
| 5,867,478 A * | 2/1999 | Baum et al. | 370/203 |
| 5,887,024 A | 3/1999 | Qin et al. | |
| 5,905,721 A | 5/1999 | Liu et al. | 370/342 |
| 5,912,165 A | 6/1999 | Cabib et al. | |
| 5,956,333 A | 9/1999 | Zhou | |

(Continued)

FOREIGN PATENT DOCUMENTS

EP   1 022 862 A2   7/2000

OTHER PUBLICATIONS

"A Reduced Complexity Algorithm for Combined Equalization and Decoding for Channels with Multipath, ISI or Partial Response" by Raphaeli and Kaitz, 1995, IEEE.

(Continued)

*Primary Examiner*—Kevin M Burd
(74) *Attorney, Agent, or Firm*—Choate Hall & Stewart LLP; Charles E. Lyon (57) ABSTRACT

The present invention is directed toward an apparatus and method for receiving signals, demodulating the signals and shaping the correlation of the output of a correlation demodulator. The present invention can be used irrespective of whether the received signals have noise components that are Gaussian or non-Gaussian. Moreover, the present invention can be utilized when a predetermined set of received signals is linearly independent or linearly dependent.

18 Claims, 7 Drawing Sheets

U.S. PATENT DOCUMENTS

| | | | |
|---|---|---|---|
| 6,011,812 A | 1/2000 | Laakso et al. | |
| 6,014,373 A | 1/2000 | Schilling et al. | 370/342 |
| 6,067,292 A * | 5/2000 | Huang et al. | 370/342 |
| 6,148,023 A | 11/2000 | Pelin et al. | |
| 6,154,443 A | 11/2000 | Huang et al. | 370/210 |
| 6,166,853 A * | 12/2000 | Sapia et al. | 359/559 |
| 6,178,197 B1 | 1/2001 | Froelich et al. | 375/150 |
| 6,202,047 B1 * | 3/2001 | Ephraim et al. | 704/256.6 |
| 6,317,612 B1 * | 11/2001 | Farsakh | 455/67.11 |
| 6,522,683 B1 * | 2/2003 | Smee et al. | 375/144 |
| 6,671,338 B1 * | 12/2003 | Gamal et al. | 375/346 |
| 6,771,723 B1 * | 8/2004 | Davis et al. | 375/350 |
| 6,801,565 B1 * | 10/2004 | Bottomley et al. | 375/148 |
| 7,292,623 B2 * | 11/2007 | Reznik | 375/148 |
| 7,636,403 B2 * | 12/2009 | Eldar et al. | 375/343 |
| 2002/0122470 A1 * | 9/2002 | Heikkila | 375/147 |
| 2002/0172291 A1 * | 11/2002 | Maggio et al. | 375/259 |

OTHER PUBLICATIONS

"Template Matching: Matched Spatial Filters and Beyond" by Brunelli and Poggio, *Pattern Recognition*, vol. 30, 1997, No. 5, pp. 751-768.

"International Search Report," PCT/US02/02512, Feb. 10, 2002.

"Non-Final Rejection," U.S. Appl. No. 09/888,762, Jan. 20, 2004.

"Non-Final Rejection," U.S. Appl. No. 09/888,762, Dec. 8, 2004.

"Non-Final Rejection," U.S. Appl. No. 09/888,762, Aug. 15, 2005.

"Final Rejection," U.S. Appl. No. 09/888,762, May 16, 2006

"Non-Final Rejection," U.S. Appl. No. 09/888,762, Jan 16, 2007.

"Non-Final Rejection," U.S. Appl. No. 09/888,762, Jul. 3, 2007.

USPTO Final Office Action, U. S. Appl. No. 09/888,762, Mar. 25, 2008.

USPTO Final Office Action, U.S. Appl. No. 09/888,762, Oct. 10, 2008.

USPTO Non-Final Office Action, U.S. Appl. No. 09/888,762, Mar. 23, 2009.

* cited by examiner

CORRELATION SHAPING MATCHED FILTER RECEIVER

GOVERNMENT SUPPORT

This invention was made with government support under Cooperative Agreement DAAL01-96-2-0001 awarded by the U.S. Army Research Laboratory. The government has certain rights in the invention.

BACKGROUND OF THE INVENTION

Many of our present technologies use signal processing principles to achieve their communication functions. In a typical signal detection application, the receiver performs the function of receiving and processing signals. A design engineer using a receiver to perform signal detection designs the receiver so that it is capable of receiving and processing a predetermined set of signals. These signals vary depending upon the system in which the design engineer is deploying the receiver. Because signals received after transmission typically contain a noise component, the receiver must process the received signal and extract information regarding the transmitted signal. The receiver may contain a detector or similar device, which could be used to determine which signal within the predetermined set of signals was in fact received by the receiver.

Many prior art receivers perform signal detection by using a correlation demodulator and a detector. One example of a correlation demodulator is a matched filter demodulator. A single matched filter is basically a linear filter whose transfer function has been matched to a particular electronic signal or environment in order to perform a filtering that is optimum for some particular purpose. See generally U.S. Pat. No. 4,044,241 "Adaptive Matched Filter," the contents of which are hereby incorporated by reference. The filter is particularly matched to a signal plus noise input from which the signal is desired to be extracted. Id. A matched filter demodulator is comprised of a bank of matched filters the output of which is sampled at one time instant to obtain a vector signal.

The matched filter demodulator can equivalently be implemented as a correlation demodulator with correlating signals equal to the time-reversed versions of the filters' transfer functions.

When one of a predetermined set of signals is received in additive white Gaussian noise, the matched filter detector is optimal for maximizing the probability of detection.

The matched filter detector is comprised of a correlation demodulator, where the correlating signals are equal to the predetermined set of signals that could have been received, followed by a detector. The detector declares as the detected signal the one for which the output of the correlator is a maximum. See generally J. G. Proakis, Digital Communications, McGraw-Hill, Inc. $3^{rd}$ ed 1995, the contents of which are hereby incorporated by reference.

Although matched filter receivers are optimal when the added noise is white and Gaussian, they are not when the received signal contains added non-Gaussian noise, or other forms of distortion. Design engineers nonetheless continue to use matched filter receivers in operating environments containing non-Gaussian or non-additive noise, in part because optimal receivers for these noise environments are typically nonlinear and, therefore, difficult to implement. Furthermore, in many applications the noise distribution is unknown to the receiver. See generally T. Kailath and V. Poor, *Detection of Stochastic Processes*, IEEE Transactions on Information Theory, vol. 44, pp. 2230-59, October 1998, the contents of which are hereby incorporated by reference. In light of the fact that many receivers are required to perform in situations where the added noise is non-Gaussian or a combination of Gaussian and non-Gaussian, there is a need for a receiver which is simple to implement, does not rely on the channel parameters and can achieve an acceptable probability of detecting the correctly received signal irrespective of whether the noise added to the received signal is white, Gaussian, or non-Gaussian.

SUMMARY OF THE INVENTION

According to one aspect, the present invention provides a receiver comprising a correlation demodulator and a correlation shaper. In one embodiment, the correlation shaper is a decorrelator. In another embodiment, the decorrelator is comprised of a whitening transformation performed on a vector signal output from the correlation demodulator. In yet another embodiment the correlation shaper outputs a vector signal whose covariance matrix has the property that the second row and each subsequent row is a permutation of the first row. In another embodiment, a subspace whitening transformation is performed on a vector signal output from the correlation demodulator. In an additional embodiment, the correlation demodulator is comprised of a bank of correlators that cross-correlate the received signal with a set of orthogonal signals. In yet another embodiment, the correlation demodulator is comprised of a bank of correlators that cross-correlate the received signal with a set of projected orthogonal signals. In an additional embodiment, the correlation demodulator is comprised of a bank of correlators that cross-correlate the received signal with a set of geometrically uniform signals. In yet another embodiment, the correlation demodulator is comprised of a bank of correlators that cross-correlate the received signal with a set of projected geometrically uniform signals. In still another embodiment, the correlation shape of a signal that is an output of the correlation demodulator can be varied.

According to another aspect, the present invention provides a method for processing signals comprising the steps of receiving a member of a predetermined set of signals; demodulating the member of the predetermined set of signals; and, shaping the correlation of the demodulated signal.

BRIEF DESCRIPTION OF THE DRAWING

The invention is described with reference to the several figures of the drawing, in which.

DETAILED DESCRIPTION

The present invention is directed toward a novel way of receiving and processing a distorted version of a signal, $s_k(t)$, which is one of a predetermined set of signals, $\{s_1(t), s_2(t) \ldots s_m(t)\}$. The one of the predetermined set of signals, $s_k(t)$, lies in a real Hilbert space H with inner product $$\langle x(t), y(t) \rangle = \int_{t=-\infty}^{\infty} x(t)y(t)\,dt.$$

The present invention is particularly useful in signal detection applications where the noise environment is not Gaussian.

A receiver is configured to receive a predetermined set of signals. This predetermined set of signals is comprised of a finite number of signals, and is hereinafter represented as $\{s_k(t), 1 \leq k \leq m\}$. The actual signal received by the receiver, $r(t)$, is comprised of one member of the predetermined set of received signals, $s_k(t)$, and a noise component, $n(t)$. In order to perform its signal detection function, a receiver must process the received signal prior to detecting which of the predetermined set of received signals it actually received.

The receiver and method of signal detection of the present invention allows an engineer to design a specific correlation shape for the output of a correlation demodulator. In this way, the present invention overcomes the problems encountered with prior art matched filter processing methods, for example, by overcoming the fact that the output of a matched filter demodulator contains elements that are correlated among themselves.

In some of the embodiments provided herein, the design engineer could choose to have the output of the correlation demodulator be completely decorrelated. In yet other embodiments the design engineer could choose to shape the correlation of the output of the correlation demodulator such that the covariance matrix of this output has the property that the second row and each subsequent row is a permutation of the first row. In alternative embodiments, an engineer practicing the present invention can choose any correlation shape for the output of the correlation demodulator. By shaping the correlation of the output of the correlation demodulator, the design engineer can design a simple receiver tailored to receive the predetermined set of signals.

The receiver and method of signal processing of the present invention are highly versatile and can be utilized irrespective of whether the predetermined set of received signals is linearly dependent or linearly independent. In addition, the received signal can be pre-whitened to facilitate signal processing when the received signal has been corrupted by colored noise. Moreover, the invention disclosed herein can be implemented for both continuous-time signals and discrete signals. Embodiments disclosed herein may also be implemented in hardware, for example in DSP chips, or in software using C++ programming language, for example. In addition to disclosing a receiver for processing signals, one aspect of the present invention also provides a novel method wherein a design engineer can alter the correlation shape of the output of a correlation demodulator.

Figure 1:
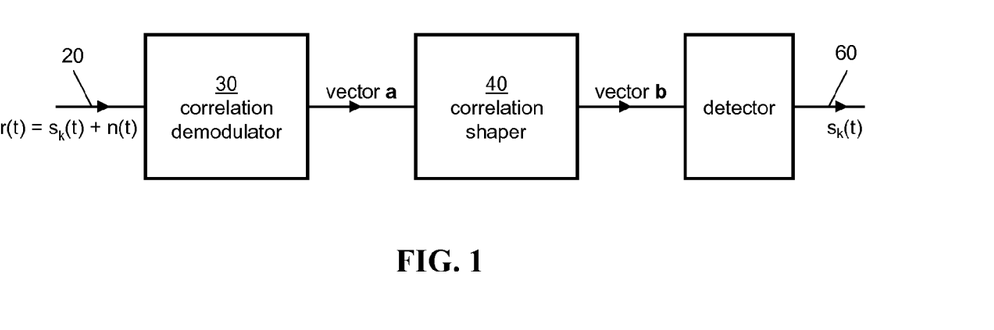
FIG. 1 is a block diagram of an illustrative receiver, which may be used with the present invention.

A basic overview of the present invention is illustrated in FIG. 1. With reference now to FIG. 1, a signal $r(t)$ 20 is first received by a receiver. The signal is then processed by a correlation demodulator 30 which may provide some correlation shaping of the vector signal output. The vector signal output of the correlation demodulator may then be additionally shaped by a correlation shaper 40. The output of the correlation shaper could be passed to a detector or similar device. The detector or similar device could process the output and determine which member of a predetermined set of signals was received by the receiver. The detector or similar device could output signal, $s_k(t)$ 60 in FIG. 1.

The embodiments are generally directed toward different implementations of the present invention. In some embodiments, a matched filter demodulator may be used. In these embodiments, the correlation of the output of the matched filter demodulator is shaped using a linear transformation. In other embodiments, the shaping of the correlation of the demodulator output is done within the demodulator by choosing a different set of signals than those used to carry out the cross-correlation in the matched filter demodulator. These embodiments of the present invention are physically distinct, but mathematically equivalent. This equivalence is shown in the following section. In the notation that follows, the symbol W is used with reference to a whitening transformation. One skilled in the art will appreciate that these equations are generally applicable to the case where the transformation is not a whitening transformation.

Mathematical Equivalence of Embodiments

A. Problem Formulation

Suppose we have a transmitter that transmits one of M signals $\{s_m(t), 1 \leq m \leq M\}$ with equal probability, where the signals lie in a real Hilbert space H with inner product $\langle x(t), y(t) \rangle = \int x(t)y(t)dt$. We assume only for simplicity of exposition here that the signals are linearly independent and normalized so that $\int s_m^2(t)dt=1$ for all m. For a discussion of the more general case of linearly dependent signals see Y. C. Eldar, A. V. Oppenheim, and D. Egnor, "Orthogonal and Projected Orthogonal Matched Filter Detection," Signal Processing, Vol. 84 (2004) pp. 677-693. The received signal $r(t)$ is modeled as $r(t)=s_k(t)+n(t)$, where $n(t)$ is a stationary white noise process with zero mean and spectral density $\sigma^2$.

Figure 4:
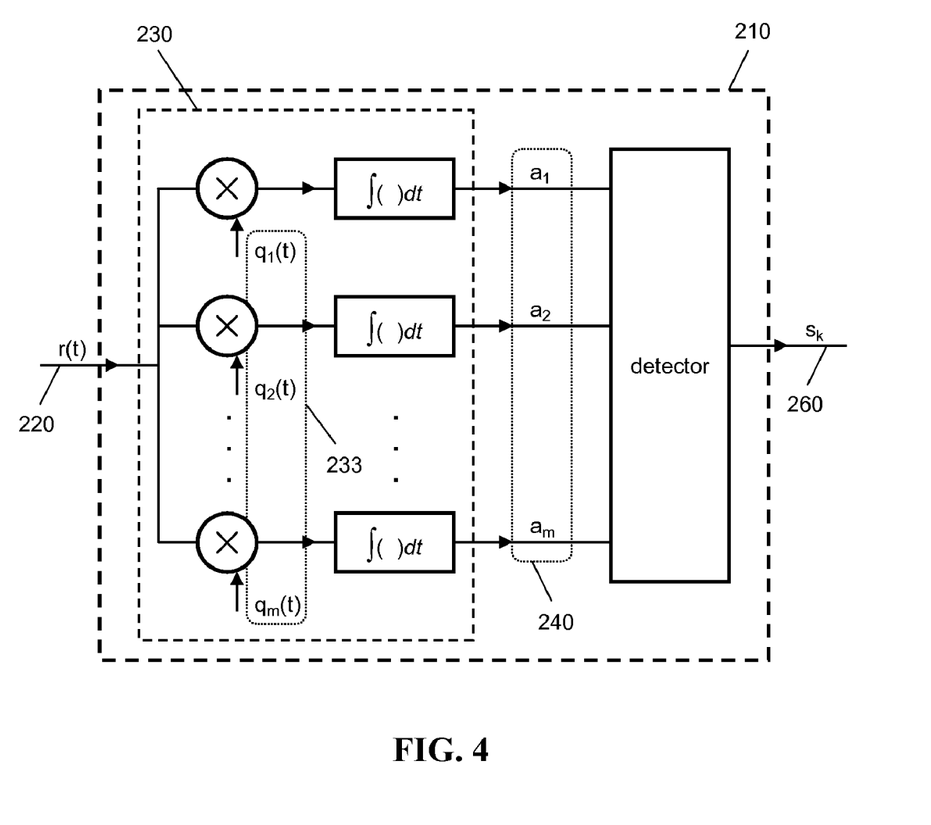
FIG. 4 illustrates various embodiments of the receiver of the present invention.

We demodulate the signal $r(t)$ using a correlation demodulator as depicted in FIG. 4. The received signal $r(t)$ is cross-correlated with M normalized signals $q_m(t) \in H$ so that $a_m = \langle q_m(t), r(t) \rangle$, where the signals $q_m(t)$ are to be determined. When the signals $q_m(t)$ are orthogonal the receiver is referred to as an orthogonal matched filter receiver. The detected signal is $s_j(t)$ where $j=\operatorname{argmax} a_m$. The difference between the orthogonal matched filter ("OMF") receiver and the matched filter ("MF") receiver lies in the choice of the signals $q_m(t)$.

If the transmitted signal is $s_k(t)$, then $$a_m = \langle q_m(t), r(t) \rangle = \langle q_m(t), s_k(t) \rangle + \langle q_m(t), n(t) \rangle \qquad (1)$$

The detected signal will be the transmitted signal $s_k(t)$ if $\max_m \langle q_m(t), s_k(t)+n(t) \rangle = \langle q_k(t)+n(t) \rangle$. Therefore, we would like to choose the signals $q_m(t)$ to maximize $\langle q_m(t), s_m(t) \rangle$ for $1 \leq m \leq M$. It is well known that the signals $q_m(t)=s_m(t)$ maximize this inner product. The resulting demodulator is then equivalent to the well known MF demodulator. We note that $q_m(t)=s_m(t)$ also maximizes the sum $$R_{hs} = \sum_{m=1}^{M} \langle q_m(t), s_m(t) \rangle,$$

since the individual terms are maximized by this choice. We will see shortly that when additional constraints are imposed, it will be useful to consider maximizing the sum rather than the individual terms.

In general, the outputs $a_m$ of the demodulator are correlated since they share information regarding the noise process $n(t)$. We would like to choose the signals $q_m(t)$ so that the outputs $a_m$ are uncorrelated. When the noise is non-Gaussian this approach does in fact lead to improved performance over conventional MF detection in many cases.

Let cov $(a_m, a_k)$ denote the cross-covariance of $a_m$ and $a_k$. Then, $$\text{cov}(a_m, a_k) = E(\langle q_m(t), n(t) \rangle \langle n(t), q_k(t) \rangle) = \sigma^2 \langle q_m(t), q_k(t) \rangle. \quad (2)$$

From (2) it follows that the outputs of the demodulator are uncorrelated if and only if the signals $q_m(t)$ are orthonormal, i.e., if and only if $\langle q_m(t), q_k(t) \rangle = \delta_{mk}$ for all m, k. We therefore propose to choose the signals $q_m(t)$ to be orthonormal.

As before, we would also like to choose the signals $q_m(t)$ to maximize $\langle q_m(t), s_m(t) \rangle$ for $1 \leq m \leq M$. However, we now have an additional constraint, namely that the signals $q_m(t)$ are orthonormal. If the signals $s_m(t)$ are not orthonormal, then we cannot maximize the inner products individually subject to this constraint. Instead, we consider maximizing the sum of the inner products. Thus, we seek a set of signals $\{q_m(t), 1 \leq m \leq M\}$ such that $$R_{hs} = \sum_{m=1}^{M} \langle q_m(t), s_m(t) \rangle \quad (3)$$

is maximized, subject to the constraint $$\langle q_m(t), q_k(t) \rangle = \delta_{mk}, 1 \leq m \leq M. \quad (4)$$

The design problems of (3) and (4) can be formulated in two equivalent ways to provide further insight into the problem. Specifically, it will be shown that the following problems are the same:

1. Find a set of orthonormal signals $\{q_m(t), 1 \leq m \leq M\}$ that maximize $R_{hs} = \Sigma_m \langle s_m(t), q_m(t) \rangle$;
2. Find an optimal whitening transformation W that minimizes the total mean squared error (MSE) between the whitened output $b = W\tilde{a}$ and the input $\tilde{a}$, where $\tilde{a}$ denotes the vector output of the conventional MF demodulator. Then choose the signals $\{q_m(t), 1 \leq m \leq M\}$ to be the orthonormal signals given by $q_m(t) = \Sigma_k (W^*)_{mk} s_k(t)$; and,
3. Find a set of orthonormal signals $\{q_m(t), 1 \leq m \leq M\}$ that are closest in a least-squares sense to the signals $\{s_m(t), 1 \leq m \leq M\}$, namely that minimize $\epsilon_{ls} = \Sigma_m \langle s_m(t) - q_m(t), s_m(t) - q_m(t) \rangle$.

Turning now to showing the equivalence between the three problems above, let $S: C^M \to H$ denote the linear transformation defined by $$Sx = \sum_{m=1}^{M} x_m s_m(t),$$

where $x \in C^M$ is an arbitrary M-dimensional vector and $x_m$ denotes the m-th component of x. Let $S^*: H \to C^M$ denote the adjoint transformation so that if $x = S^* y(t)$ for arbitrary $y(t) \in H$, then $x_m = \langle s_m(t), y(t) \rangle$. Let $\tilde{a}$ denote the vector with the m-th component $\tilde{a}_m$, where $\tilde{a}_m$ is the output of the correlation demodulator when $q_m(t) = s_m(t)$. From (2) it follows that the covariance matrix of $\tilde{a}$ denoted $C_a$, is given by $$C_a = \sigma^2 S^* S, \quad (5)$$

where the mk-th element of $S^*S$ is $\langle s_m(t), s_k(t) \rangle$. If the signals $s_m(t)$ are not orthonormal, then $C_a$ is not diagonal and the elements of $\tilde{a}$ are correlated. Suppose we whiten $\tilde{a}$ using a whitening transformation W to obtain the random vector $b = W\tilde{a}$, where the covariance matrix of b is given by $C_b = \sigma^2 I$, and then base our detection on b. Thus, the components $b_m$ are the inputs to the detector, and the detected signal is $s_k(t)$ if $k = \arg\max b_m$. Since the detector bases its decision on the vector b, we choose a whitening transformation W that minimizes the MSE given by $$\epsilon_{mse} = \sum_{m=1}^{M} E((b'_m - \tilde{a}'_m)^2), \quad (6)$$

where $\tilde{a}'_m = \tilde{a}_m - E(\tilde{a}_m)$ and $b'_m = b_m - E(b_m)$.

That is, from all possible whitening transformations, we seek the one that results in a white vector b as close as possible to the original vector $\tilde{a}$.

Figure 3:
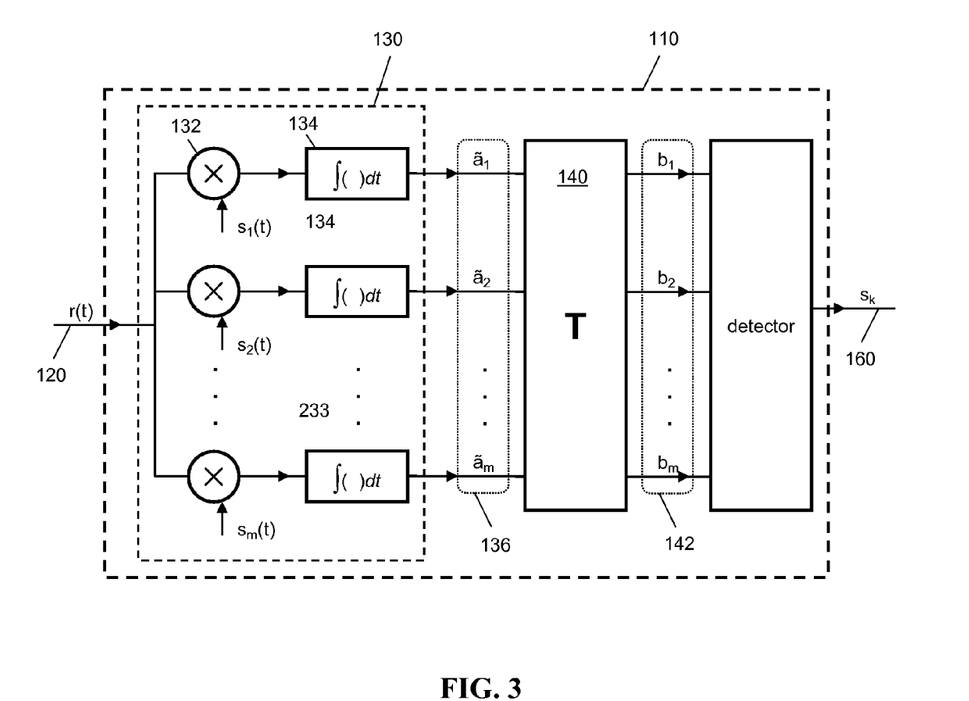
FIG. 3 illustrates various embodiments of the receiver of the present invention.

We now show that the demodulator depicted in FIG. 3 is equivalent to the correlation demodulator of FIG. 4 where the signals $q_m(t)$ are orthonormal and given by $q_m(t) = \Sigma_k (W^*)_{mk} s_k(t)$ where $(W^*)_{mk}$ denotes the mk th element of w. In other words, the outputs of FIGS. 3, 4 are equal, provided that $q_m(t) = \Sigma_k (W^*)_{mk} s_k(t)$.

The vector output b of FIG. 3 is given by $$b = W\tilde{a} = WS^* r(t) = Q^* r(t) \quad (7)$$

where $Q: C^M \to H$ is given by $Q = SW^*$. Therefore, b can be viewed as the output of a correlation demodulator with signals $q_m(t) = \Sigma_k (W^*)_{mk} s_k(t)$.

We now need to show that the signals $q_m(t)$ are orthonormal. It is sufficient to show that $Q^*Q = WS^*SW^* = I$. By definition, $C_b = \sigma^2 I$. In addition, $C_b = WC_a W^*$ and from (5) $C_a = \sigma^2 S^* S$. Therefore, $$Q^*Q = WS^*SW^* = \frac{1}{\sigma^2} C_b = I.$$

In summary, the output of FIG. 3 may be obtained using the correlation demodulator of FIG. 4, where the signals $q_m(t)$ are orthonormal and given by $q_m(t) = \Sigma_k (W^*)_{mk} s_k(t)$.

We now show the minimization of $\epsilon_{mse}$ given by (6), is equivalent to maximization of $R_{hs}$ given by (3). Using (7) we have $$b - \tilde{a} = (Q^* - S^*) r(t) = (Q^* - S^*)(s_k(t) + n(t)) \quad (8)$$

and $$b'_m - \tilde{a}'_m = \langle q_m(t) - s_m(t), n(t) \rangle. \tag{9}$$

Substituting (9) into (6) we have $$\varepsilon_{mse} = \sum_{m=1}^{M} E(\langle q_m(t) - s_m(t), n(t) \rangle^2). \tag{10}$$

Let $e_m = E(\langle s_m(t) - q_m(t), n(t) \rangle^2)$.

Then, $e_m = E\left(\int_t (s_m(t) - q_m(t))n(t)\,dt\right)^2 =$ $$\int_{t,t'} (s_m(t) - q_m(t))(s_m(t') - q_m(t'))E(n(t)n(t'))\,dt\,dt' =$$

$$\sigma^2 \int_t (s_m(t) - q_m(t))^2\,dt =$$

$$\sigma^2 \langle s_m(t) - q_m(t), s_m(t) - q_m(t) \rangle \tag{11}$$

Combining (10) and (11) we see that minimization of $\varepsilon_{mse}$ is equivalent to minimization of $\varepsilon_{ls}$, where $$\varepsilon_{ls} = \sum_{m=1}^{M} \langle s_m(t) - q_m(t), s_m(t) - q_m(t) \rangle. \tag{12}$$

Therefore, the optimal whitening problem is equivalent to the problem of finding a set of orthonormal signals $\{q_m(t), 1 \leq m \leq M\}$ that are closest in the least-squares sense to the signals $\{s_m(t), 1 \leq m \leq M\}$.

Finally, we show that this least-squares problem is equivalent to our original design problem of (3) and (4). Expanding $\varepsilon_{ls}$, we have $$\varepsilon_{ls} = \tag{13}$$

$$= \sum_{m=1}^{M} (\langle s_m(t), s_m(t) \rangle + \langle q_m(t), q_m(t) \rangle - 2\langle s_m(t), q_m(t) \rangle)$$

$$= \sum_{m=1}^{M} (2 - 2\langle s_m(t), q_m(t) \rangle)$$

From (3) and (13) it follows that minimization of $\varepsilon_{ls}$ is equivalent to maximization of $R_{hs}$. Since minimization of $\varepsilon_{mse}$ is equivalent to minimization of $\varepsilon_{ls}$, we conclude that these three problems are equivalent.

Note, that if the transmitted signals $s_m(t)$ are orthonormal, then the output of the MF demodulator $\tilde{a}$ is white. Thus, in this case $W=I$ and the OMF detector is equivalent to the MF detector. Alternatively, if the signals $s_m(t)$ are orthonormal, then the residual least-squares error $\varepsilon_{ls}$ is minimized when $q_m(t) = s_m(t)$, and again the OMF detector reduces to the MF detector.

B. Optimal Whitening

Since the optimal whitening problem is equivalent to the problem of (3)-(4), we can choose to determine the signals $\{q_m(t), 1 \leq m \leq M\}$ by solving this problem.

We first restate the optimal whitening problem in its most general form. Let $a \in R^M$ be a random vector with m-th component $a_m$ and positive-definite covariance matrix $C_a$, and let $a'_m = a_m - E(a_m)$. We seek a whitening transformation W such that the white vector $b = Wa$ has a covariance matrix $C_b = \sigma^2 I$, and is as close as possible to a in the MSE sense. Thus, we seek the transformation W that minimizes $$\varepsilon_{mse} = \sum_{m=1}^{M} E((a'_m - b'_m)^2) \tag{14}$$

where $b_m$ is the mth component of b, and $b'_m = b_m - E(b_m)$, subject to the constraint $$C_b = W C_a W^* = \sigma^2 I \tag{15}$$

where $C_b$ is the covariance matrix of b. Since W must be invertible (15) reduces to $$\sigma^2 (W^* W)^{-1} = C_a. \tag{16}$$

We solve this minimization problem using the eigendecomposition of $C_a$ and the singular value decomposition (SVD) of W.

Let the vectors $v_k$ denote the orthonormal eigenvectors of $C_a$, so that $$C_a v_k = \lambda_k v_k, 1 \leq k \leq M \tag{17}$$

where $\lambda_K > 0$. We can then decompose $C_a$ as $C_a = VDV^*$ where V denotes the unitary matrix of columns $v_k$ and D denotes the diagonal matrix with diagonal elements $\lambda_K$. Then $$W^* W v_k = \sigma^2 C_a^{-1} v_k = \sigma^2 \lambda_k^{-1} v_k \tag{18}$$

From the properties of the SVD, it then follows that $$W v_k = \sigma_k u_k, 1 \leq k \leq M \tag{19}$$

where $$\sigma_k = \sigma / \sqrt{\lambda_k}$$

and the vectors $u_k$ are orthonormal.

Since the M vectors $v_k \in C^M$ are orthonormal, they span the space $C^M$ and any $x \in C^M$ may be expressed as $x = \Sigma_k \langle v_k, x \rangle v_k$ where the inner product on $C^M$ is defined as $\langle v_k, x \rangle = v_k^* x$. Let $a' = a - E(a)$ and $b' = b - E(b)$. Then $a' = \Sigma_k \langle v_k, a' \rangle v_k$ and $$b' - a' = Wa' - a' = \sum_k \langle v_k, a' \rangle (\sigma_k u_k - v_k), \tag{20}$$

where we used (19). We can now express $\varepsilon_{mse}$ of (14) as $$\varepsilon_{mse} = E(\langle b' - a', b' - a' \rangle^2) = \tag{21}$$

$$\sum_{k,m} E(\langle v_m, a' \rangle \langle a', v_k \rangle) \langle \sigma_k u_k - v_k, \sigma_m u_m - v_m \rangle$$

Now, $$E(\langle v_m, a' \rangle \langle a', v_k \rangle) = \langle v_m, C_a v_k \rangle = \lambda_k \langle v_m, v_k \rangle = \lambda_k \delta_{mk} \tag{22}$$

Substituting (22) in (21) results in $$\varepsilon_{mse} = \sum_k \lambda_k \langle \sigma_k u_k - v_k, \sigma_k u_k - v_k \rangle = \sum_k \lambda_k (\sigma_k^2 + 1 - 2\sigma_k \Re(\langle u_k, v_k \rangle)), \quad (23)$$

where $\Re(\cdot)$ denotes the real part. From (23) it follows that minimizing $\epsilon_{mse}$ is equivalent to maximizing $A = \Sigma_k \sigma_k \Re(\langle u_k, v_k \rangle)$. Using the Cauchy-Schwartz inequality we have, $$\leq \sum_k \sigma_k |\langle u_k, v_k \rangle| \quad (25)$$

$$\leq \sum_k \sigma_k (\langle u_k, u_k \rangle \langle v_k, v_k \rangle)^{1/2} = \sum_k \sigma_k \quad (26)$$

with equality in (25) if and only if $\langle u_k, v_k \rangle$ is real and nonnegative, and equality in (26) if and only if $u_k = c_k v_k$ for some nonzero constants $c_k$. Since the vectors $u_k$ are orthonormal $\langle u_k, u_k \rangle = 1$. We therefore conclude that $A \leq \Sigma_k \sigma_k$ with equality if and only if $u_k = v_k$. Thus, $\epsilon_{mse}$ is minimized when W is given by $$W v_k = \sigma_k v_k = \frac{\sigma}{\sqrt{\lambda_k}} v_k \quad (27)$$

or $$W = \sigma V D^{-1/2} V^* = \sigma C_a^{-1/2} \quad (28)$$

In summary, the optimal whitening transformation that minimizes the MSE $\epsilon_{mse}$ defined in (14) for an input a with covariance $C_a$ and an output b with covariance $C_b = \sigma^2 I$, is $W = \sigma C_a^{-1/2}$.

In FIG. 3 the input to the whitening transformation is $a = \tilde{a}$ with $C_a = \sigma^2 S^* S$. Thus, the optimal whitening transformation in this case is $W = (S^* S)^{-1/2}$, and the optimal orthonormal signals $q_m(t)$ that maximize $R_{hs}$ are given by $q_m(t) = \Sigma_k (W^*)_{mk} s_k(t)$ or $q_m(t) = Q i_m$ where $Q = S(S^* S)^{-1/2}$ and $i_m(k) = \delta_{mk}$. If the signals $s_k(t)$ are linearly dependent, then $W = ((S^* S)^{1/2}) \backslash$ where $(\ )\backslash$ denotes the Moore-Penrose pseudo-inverse.

C. Covariance Matrix of the Output is Arbitrary:

The correlation shaper in FIG. 3 can be chosen so that the covariance matrix is arbitrary within the mathematical constraints imposed on any covariance matrix. In this case the correlation shaper can be chosen so that $WC_a W^* = C_b$.

D. Covariance Matrix of the Output has the Permutation Property:

Suppose we choose the correlation shaper in FIG. 3 so that the covariance matrix of the output has the property that the second row and each subsequent row is a permutation of the first row.

Let $d_k$ be the elements of the first row of the specified covariance matrix. The correlation shaper that minimizes the MSE between the input and output is given as follows.

Let D be a diagonal matrix whose diagonal elements are the square-roots of the generalized Fourier transform of the sequence $d_k$; the generalized Fourier transform is defined on a group formed by the elements of the pre-specified covariance matrix. See generally, Y. C. Eldar, G. D. Forney, Jr., "On quantum detection and the square-root measurement", IEEE Trans. on Inform. Theory, vol. 47, No. 3, March 2001, the contents of which are hereby incorporated by reference.

Let F be a Fourier matrix representing the generalized Fourier transform over the group formed by the elements of the covariance matrix.

For linearly independent signals:

$$W = SFD(DF^* S^* SFD)^{-1/2} DF^*$$

For linearly dependent signals:

$$W = SFD((DF^* S^* SFD)^{-1/2}) DF^*$$

1. Orthogonal/Projected Orthogonal & Geometrically Uniform & Projected Geometrically Uniform Correlating Signals In all cases the closest signals (in a least-squares sense) to the predetermined set of received signals are given by the equation $$q_k(t) = \sum_{l=1}^{m} s_l(t)(W)_{lk}^*$$

where $(W)_{lk}^*$ is the lk-th element of W. As was previously the case, one skilled in the art will recognize that the these equations are equally valid when the transformation is not a whitening transformation.

Figure 2:
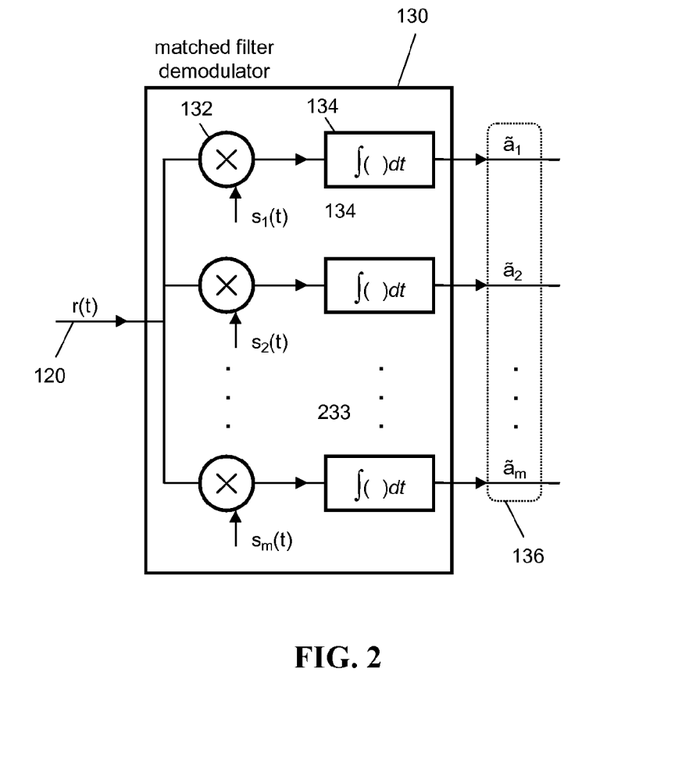
FIG. 2 is a block diagram of an illustrative matched filter demodulator, which may be used with the present invention.

As previously mentioned, in some of the embodiments, the correlation demodulator 30 is a matched filter demodulator. Reference will now be made to FIG. 2. The matched filter demodulator 130 receives an incoming signal, r(t) 120, and processes the received signal 120 through a plurality of multipliers 132 and integrators 134. The plurality of multipliers 132 and integrators cross-correlate the received signal 120 with the predetermined set of signals $\{s_1(t), s_2(t) \ldots s_m(t)\}$. After this cross-correlation, the matched filter demodulator 130 outputs a correlated signal $\{\tilde{a}_1, \tilde{a}_2 \ldots \tilde{a}m\}$ 136.

An illustration of a preferred embodiment of the present invention is provided in FIG. 3. FIG. 3 illustrates a received signal r(t) 120, the matched filter demodulator 130 of FIG. 2, demodulator output signal $\{\tilde{a}_1, \tilde{a}_2 \ldots \tilde{a}_m\}$ 136, a correlation shaper 140, and an output of the correlation shaper $\{b_1, b_2 \ldots b_m\}$ 142. Four embodiments will be discussed with reference to FIG. 3. The embodiments vary depending on the correlation shape chosen by the design engineer and upon whether the predetermined set of signals $\{s_1(t), s_2(t) \ldots s_m(t)\}$ is linearly independent or linearly dependent.

Embodiment No. 1

Linearly Independent Received Signals & Decorrelated Output

In the first of these four embodiments, it is assumed that the correlation shape chosen is to have the output $\{b_1, b_2 \ldots b_m\}$ be completely decorrelated. In addition, in this embodiment, the predetermined set of signals $\{s_1(t), s_2(t) \ldots s_m(t)\}$ is linearly independent. In this embodiment, the correlation shaper 140 performs a whitening transformation on the matched filter demodulator output signal 136. After the whitening transformation, the output of the correlation shaper 140, which was correlated when it emerged from the matched filter demodulator 130, becomes uncorrelated. In this embodiment, it may be desirable to minimize the mean squared error between the output of the correlation shaper 142 and the output of the matched filter demodulator 136. This embodiment may perform satisfactorily for a given system even if the covariance shaper does not result in the smallest mean squared error value between the output of the correlation shaper 142 and the matched filter demodulator 136.

Embodiment No. 2

Linearly Independent Received Signals & Output with Specific Correlation Shape

An alternative embodiment of the present invention, also shown in FIG. 3, allows a design engineer to specify a correlation shape for the output of the correlation shaper 140, depicted as $\{b_1, b_2 \ldots b_m\}$ in FIG. 3. The correlation shape of $\{b_1, b_2 \ldots b_m\}$ is given by the covariance matrix of b, 142, where b is a vector with components $b_k$. An engineer can alter the correlation shape of b 142 by choosing the covariance matrix to have specific properties. In addition, one skilled in the art may decide in certain circumstances to allow the correlation shape of the output of the correlation shaper to be arbitrary. In this instance, the covariance matrix can be comprised of arbitrary values that satisfy the constraints imposed on any covariance matrix.

This embodiment differs from the one previously described, in which the correlation shaper decorrelated its output by performing a whitening transformation on the input of the correlation shaper. Rather, in this embodiment, the transformation is chosen so that the output of the correlation shaper has an arbitrary correlation shape.

In this embodiment, it may additionally be desirable to minimize the mean squared error between the output of the correlation shaper 142 and the output of the matched filter demodulator 136. We assume that the second and each subsequent row is chosen to be a permutation of the first. An engineer may alter the correlation shape of the output by altering the permutations of the rows of the covariance matrix.

This embodiment may perform satisfactorily for a given system even if the correlation shaper does not result in the smallest mean squared error value between the output of the correlation shaper 142 and the matched filter demodulator 136.

Embodiment No. 3

Linearly Dependent Received Signals & Decorrelated Output

In an alternative embodiment of the inventive receiver, the output of the correlation shaper 140 can be decorrelated when the predetermined set of signals $\{s_1(t), s_2(t) \ldots s_m(t)\}$ is linearly dependent. When the predetermined set of signals is linearly dependent, the outputs of the matched filter demodulator are deterministically linearly dependent, meaning that vector $\tilde{a}$ and the elements of $b = W\tilde{a}$ are also linearly dependent. The linear dependence of the predetermined set of signals renders conventional whitening techniques impossible. Thus, in this alternative embodiment, the outputs of the matched filter demodulator will be whitened on the subspace upon which they lie.

Making reference now to FIG. 3, the outputs of the matched filter demodulator 136 lie in a subspace V of $R^m$. In this embodiment, it is desirable to whiten the outputs of the matched filter demodulator $\{\tilde{a}_1, \tilde{a}_2, \ldots \tilde{a}_m\}$ 136 on the subspace V, hereinafter referred to as subspace whitening. In this embodiment, subspace whitening is defined so that the whitened signal lies in V and its representation in terms of any orthonormal basis for V is white.

In this embodiment, it may be desirable to minimize the mean squared error between the output of the correlation shaper 142 and the output of the matched filter demodulator 136. This embodiment may perform satisfactorily for a given system even if the correlation shaper does not result in the smallest mean squared error value between the output of the correlation shaper 142 and the matched filter demodulator 136.

Embodiment No. 4

Linearly Dependent Received Signals & Output Has Specific Correlation Shape

An additional embodiment of the present invention can be used when the predetermined set of signals $\{s_1(t), s_2(t) \ldots s_m(t)\}$ is linearly dependent. As opposed to Embodiment No. 3 discussed above, an engineer utilizing this embodiment would choose a correlation shape for the output of the correlation shaper 140. In this embodiment, the correlation shaping performed by the correlation shaper 140 is similar to that described in Embodiment No. 2, except that correlation shaping in this embodiment is performed on a subspace spanned by the predetermined set of signals $\{s_1(t), s_2(t) \ldots s_m(t)\}$. In this embodiment, it may desirable to minimize the mean squared error between the output of the correlation shaper 142 and the output of the matched filter demodulator 136. This embodiment may perform satisfactorily for a given system even if the correlation shaper does not result in the smallest mean squared error value between the output of the correlation shaper 142 and the matched filter demodulator 136.

Embodiment No. 5-8

Choosing a Set of Orthogonal Signals

An alternative embodiment of the present invention is depicted in FIG. 4. The receiver 210 comprises a received signal r(t) 220, a correlation demodulator 230, a set of output signals $\{a_1, a_2 \ldots a_m\}$ from the correlation demodulator 240, and one of a predetermined set of signals received by the receiver, $s_k(t)$ 260. In this embodiment, the correlation shaping is achieved by selecting the signals $\{q_1(t), q_2(t) \ldots q_m(t)\}$ 233. The selection of this set of signals varies depending upon the desired correlation shape of the output vector $\{a_1, a_2 \ldots a\}$ 240 and upon whether the predetermined set of signals $\{s_1(t), s_2(t) \ldots s_m(t)\}$ is linearly independent or linearly dependent. Alternative embodiments for each of these variations are discussed below.

Embodiment No. 5

Linearly Independent Received Signals & Orthogonal Signals

Making reference now to FIG. 4, the first of these embodiments will be discussed. The output signal $\{a_1, a_2 \ldots a_m\}$ 240 is decorrelated and the predetermined set of signals $\{s_1(t), s_2(t) \ldots s_m(t)\}$ is linearly independent. If the desired correlation shape is to have the output of the correlation demodulator 230 be decorrelated, the set of signals $\{q_1(t), q_2(t) \ldots q_m(t)\}$ 233 should be orthogonal. In this embodiment, it may be desirable to minimize the least squares error between the orthogonal signals $\{q_1(t), q_2(t) \ldots q_m(t)\}$ 233 and the predetermined set of signals $\{s_1(t), s_2(t) \ldots s_m(t)\}$. While minimizing this least-squares value is preferred in this embodiment, those skilled in the art will recognize that adequate performance may be achieved although the least-squares error may not be at its minimum.

Embodiment No. 6

Linearly Independent Received Signals & Geometrically Uniform Signals

If an engineer desired a particular correlation shape for $\{a_1, a_2 \ldots a_m\}$ 240, the engineer could achieve this result by altering the choice of the signal set $\{q_1(t), q_2(t) \ldots q_m(t)\}$ 233. If the covariance of the output of the correlation shaper has the property that the second and each subsequent row is chosen to be a permutation of the first, this can be achieved by choosing $\{q_1(t), q_2(t) \ldots q_m(t)\}$ to be geometrically uniform. See generally G. D. Forney, Jr., "Geometrically Uniform Codes," IEEE Trans. Inform. Theory, vol. IT-37, No. 5, pp. 1241-60, September 1991, the contents of which are hereby incorporated by reference. It may be desirable in this embodiment to minimize the least-squares error between the geometrically uniform signals and the predetermined set of signals $\{s_1(t), s_2(t) \ldots s_m(t)\}$. Thus, an alternative embodiment of the present invention comprises minimizing the least-squares error between $\{q_1(t), q_2(t) \ldots q_m(t)\}$ and $\{s_1(t), s_2(t) \ldots s_m(t)\}$ and requiring $\{q_1(t), q_2(t) \ldots q_m(t)\}$ to be geometrically uniform.

Embodiment No. 7

Linearly Dependent Signals & Projected Orthogonal Signals

If the desired correlation shape is to have the output of the output of the correlation demodulator be decorrelated on the space in which it lies, the set of signals $\{q_1(t), q_2(t) \ldots q_m(t)\}$ should be chosen as a projected orthogonal signal set. In yet another embodiment to be used when the predetermined set of signals is linearly dependent, the signals, $\{q_1(t), q_2(t) \ldots q_m(t)\}$ 233 in FIG. 4, are the closest projected orthogonal signals to the predetermined set of signals, $\{s_1(t), s_2(t) \ldots s_m(t)\}$, in a least-squares sense. The projected orthogonal signals are a projection of a set of orthonormal signals onto the space spanned by the predetermined set of signals, $\{s_1(t), s_2(t) \ldots s_m(t)\}$. Analogously to the previous embodiment, skilled artisans will recognize that, depending upon particular system constraints, an absolute minimum least-squares value need not be attained in order to achieve adequate performance.

Embodiment No. 8

Linearly Dependent Received Signals & Projected Geometrically Uniform Signals The present invention can also be used to achieve a particular correlation shape among the members of the output vector a 240 when the predetermined signals $\{s_1(t), s_2(t) \ldots s_m(t)\}$ are linearly dependent. If the covariance matrix of a 240 when represented in terms of an orthonormal basis for the space in which it lies has the property that subsequent rows are permutations of the first, then $\{q_1(t), q_2(t) \ldots q_m(t)\}$ should be selected to be a set of projected geometrically uniform set of signals, i.e., a set of geometrically uniform signals projected onto the space spanned by the predetermined set of signals. In an alternative embodiment, the signals $\{q_1(t), q_2(t) \ldots q_m(t)\}$ 233 are chosen to be the closest projected geometrically uniform signals in a least-squares sense to the signals $\{s_1(t), s_2(t) \ldots s_m(t)\}$. In this way, an engineer is able to determine a correlation shape for $\{a_1, a_2 \ldots a_m\}$ 240, when the predetermined set of signals $\{s_1(t), s_2(t) \ldots s_m(t)\}$ is linearly dependent.

Embodiment No. 9

Method of Performing Signal Detection

An additional embodiment comprises a method for processing a signal from a predetermined set of signals, wherein the method includes the steps of receiving a member of a predetermined set of signals; demodulating the member; outputting a demodulated signal; and shaping the correlation of the demodulated signal.

Test Results for Embodiment Nos. 5 & 7

The results of tests conducted using an implementation of Embodiment Nos. 5 & 7 are provided below. In each test, signal detection was executed and the results compared to the signal detection capabilities of a matched filter. One skilled in the art will recognize that the signal detection properties tested herein are indicative of the performance that the present invention would exhibit when implemented as part of a receiver or as part of a method of signal detection. Two types of random signals were used, each 100 samples in length: (1) binary signals where each sample takes on the value 0 or 1 with equal probability; and, (2) computer simulated analog signals where each sample is uniformly distributed between 0 and 1. The non-Gaussian noise distribution was chosen as a Gaussian mixture of two components with equal weights.

For ease of notation, the embodiments of FIG. 4 will be referred to in short hand. In the case where the predetermined set of received signals is linearly independent, the orthogonal matched filter will be referred to as "OMF." In the case of where the predetermined set of received signals is linearly dependent, the projected orthogonal matched filter will be referred to as "POMF." Both the OMF and the POMF were tested in Gaussian and non-Gaussian noise environments.

A Gaussian mixture of two components each with standard deviation 0.25 centered at ±1, corresponding to a signal-to-noise-ratio ("SNR") close to 0 dB was tested first. Five hundred realizations of each type of signal were generated. For each realization of the signal, a probability of detection was determined by recording the number of successful detections over 500 noise realizations. The histograms of the probability of detection $P_d$ for the different detectors were plotted. These histograms indicated that $P_d$ has a unimodal distribution with a bell-shaped appearance. The results of these tests are presented in terms of the mean and standard deviation of $P_d$ for the various detectors in FIG. 5 and FIG. 6.

Figure 5:
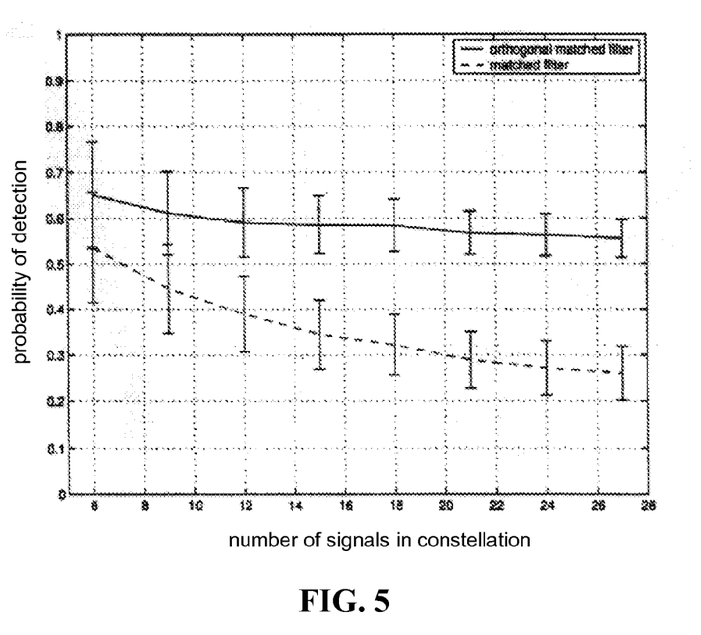
FIG. 5 is a plot of test results for one embodiment of the present invention.
Figure 6:
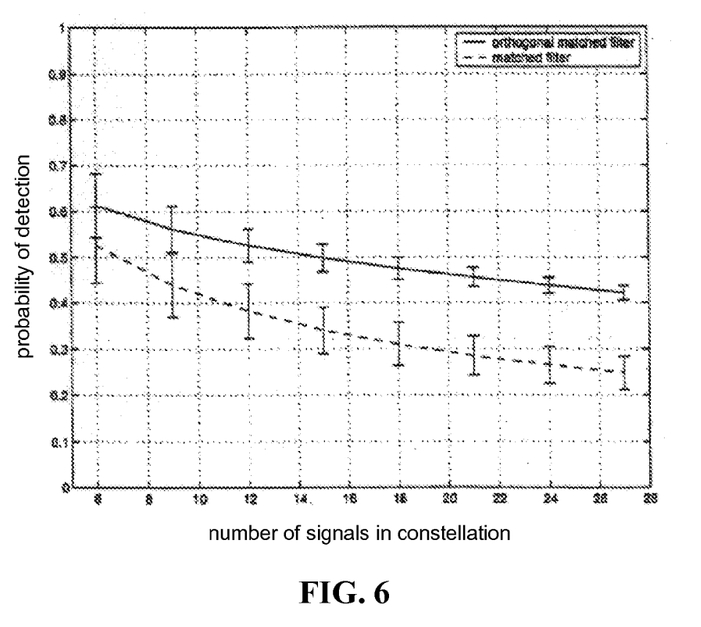
FIG. 6 is a plot of test results for one embodiment of the present invention.

Reference will now be made to FIG. 5 and FIG. 6. These figures contain the mean of $P_d$ for the OMF detector and the matched filter detector as a function of the number of signals in the transmitted constellation. The vertical lines indicate the standard deviation of $P_d$. The results in FIG. 5 were obtained for binary signals, and the results in FIG. 6 for computer simulated analog signals. Both figures demonstrate the superior results obtained by the OMF detector when compared with the matched filter detector.

Figure 7:
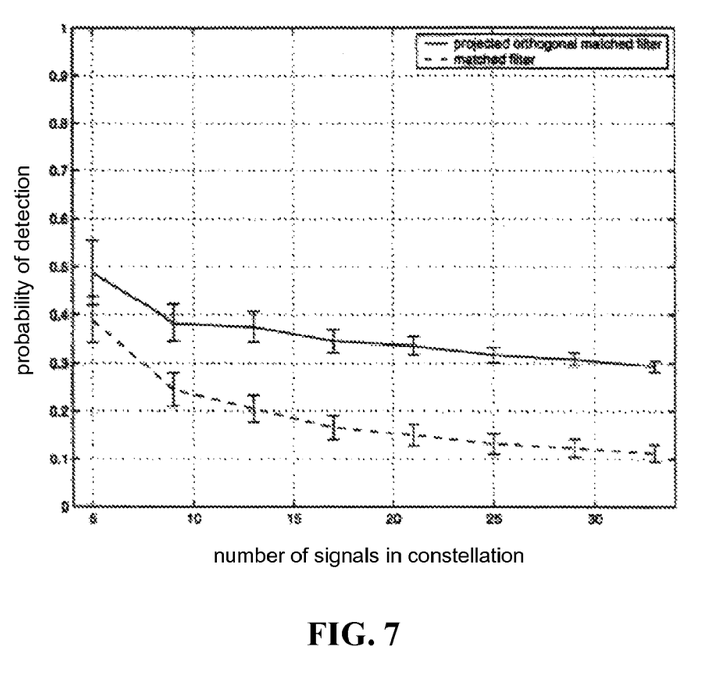
FIG. 7 is a plot of test results for one embodiment of the present invention.

FIG. 7 is a plot of the mean and standard deviation of $P_d$ for the POMF detector and the matched filter detector as a function of the number of signals in the transmitted constellation. In this simulation, the Gaussian mixture of two components had a standard deviation 0.25 centered at ±1. For each signal constellation, ⅔ (rounded up) of the signals were linearly independent. The dependent signals were generated by randomly mixing a set of linearly independent signals where the signal and mixing elements were uniformly distributed between 0 and 1.

The qualitative behavior of the POMF detector is similar to that of the OMF detector, even when compared under various Gaussian mixture parameters and SNRs. FIGS. 5-7 demonstrate the superior results obtained with OMF and POMF detectors when compared to the matched filter detector in a non-Gaussian noise environment.

Figure 8:
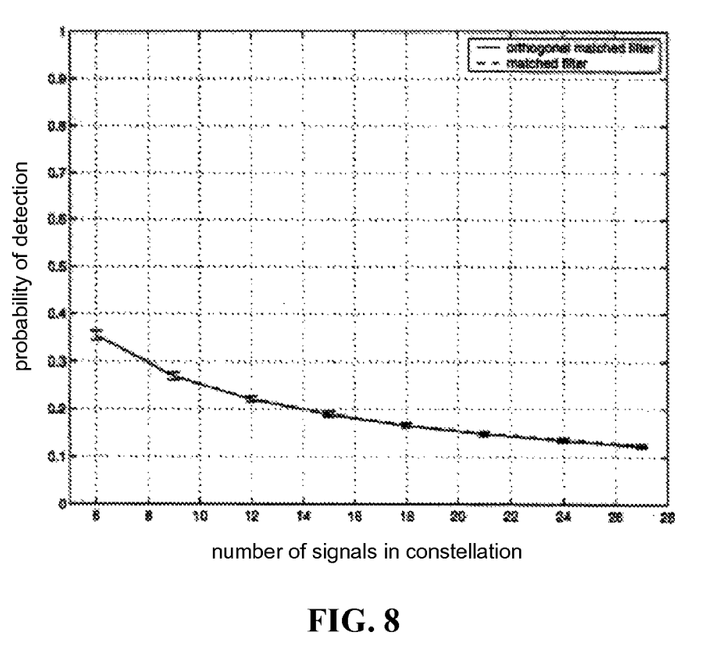
FIG. 8 is a plot of test results for one embodiment of the present invention.
Figure 9:
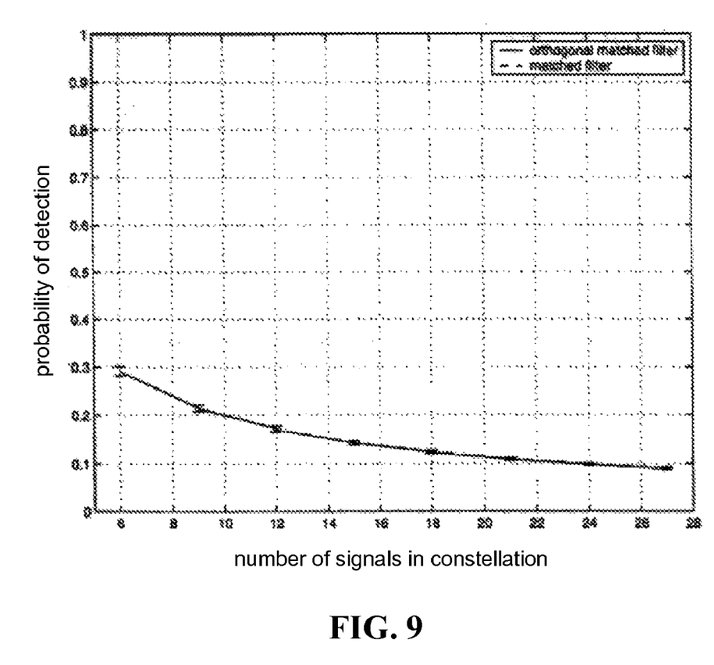
FIG. 9 is a plot of test results for one embodiment of the present invention.
Figure 10:
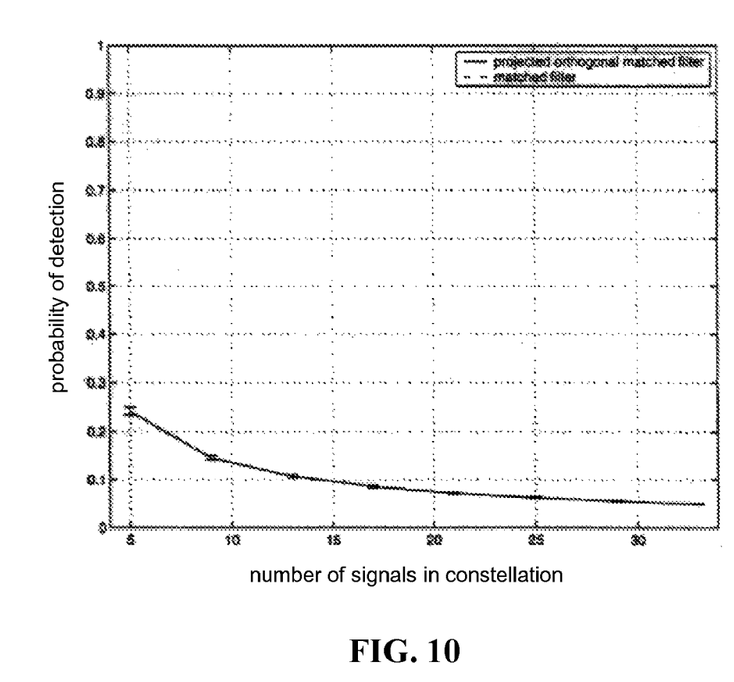
FIG. 10 is a plot of test results for one embodiment of the present invention.
Figure 11A:
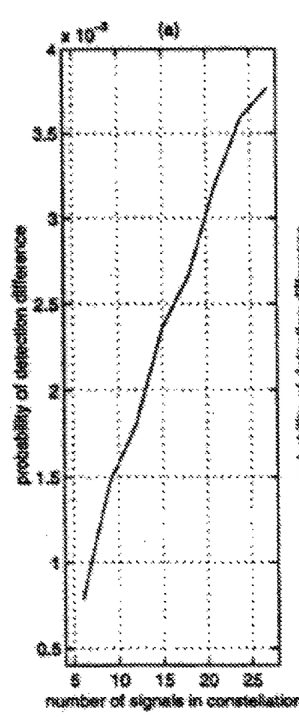
FIG. 11 is a plot of test results for one embodiment of the present invention.
Figure 11B:
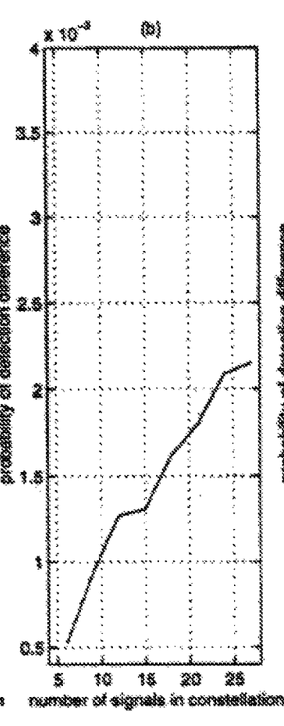
Figure 11C:
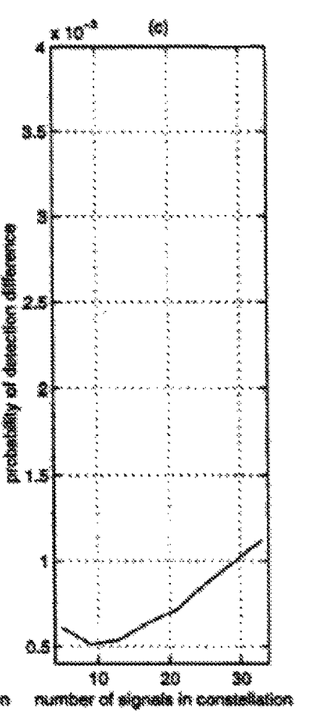

These tests were repeated in a Gaussian noise environment, the results of which are provided in FIGS. 8-10. The details of the simulations were identical to those of FIGS. 5, 6, and 7, respectively, with the Gaussian noise replacing the Gaussian mixture noise. FIGS. 11(*a*) and (*b*) are plots of the difference in the probability of detection (on a scale of $10^{-3}$) using the OMF and matched filter detectors for transmitted constellations of 15 signals in Gaussian noise, for binary and computer simulated analog signals respectively. FIG. 11(*c*) is a plot of the difference in the probability of detection using the POMF and matched filter detectors in Gaussian noise. The qualitative behavior of the OMF and POMF detectors in comparison to the matched filter detector is similar for varying values of the variance of the Gaussian noise.

For Gaussian noise the matched filter detector outperformed the OMF and the POMF detectors. This appears consistent with the fact that the matched filter detector maximizes the probability of detection for Gaussian noise. However, it is evident from FIGS. 8-11 that the relative improvement in performance using the matched filter detector over the OMF and POMF detectors is insignificant.

Other embodiments of the invention will be apparent to those skilled in the art from a consideration of the specification or practice of the invention disclosed herein. It is intended that the specification and examples are illustrative only. Although various embodiments have been described in detail, it should be understood that various changes, substitutions, and alterations can be made herein by one of ordinary skill in the art without departing from the scope of the present invention as hereinbefore described and as hereinafter claimed.

What is claimed is:

1. A receiver comprising:
   a correlation demodulator, the correlation demodulator receiving one or more predetermined signals and noise, the demodulator having plural correlators, each correlator cross correlating the one or more predetermined signals and noise with a signal and outputting a correlation signal, and the demodulator providing a set of correlation signals a, the correlation signals a having a first covariance matrix; and
   a correlation shaper, the correlation shaper receiving the set of correlation signals a and transforming the correlation signals a to a second set of signals b, equal in number to the set of correlation signals a, the second set of signals b having a second covariance matrix and the second covariance matrix is proportional to an identity matrix on at least a subspace of the second covariance matrix.

2. The receiver of claim 1 wherein the correlation demodulator is a matched filter demodulator.

3. The receiver of claim 1, wherein the transformation is a whitening transformation determined substantially by minimizing the mean squared error of the difference between the second set of signals and the set of correlation signals.

4. The receiver of claim 1, wherein the transformation is determined substantially by minimizing the mean squared error of the difference between the second set of signals and the set of correlation signals.

5. The receiver of claim 1, wherein the transformation is a subspace whitening transformation performed on the set of correlation signals.

6. The receiver of claim 5, wherein the subspace whitening transformation is determined substantially by minimizing the mean squared error of the difference between the second set of signals and the set of correlation signals.

7. The receiver of claim 1, wherein the transformation is performed on a subspace.

8. A method for processing signals comprising the steps of:
   receiving a signal, the signal having at least one member of a predetermined set of signals that has undergone some distortion;
   demodulating the received signal in a correlation demodulator adapted to correlate the received signal in plural correlators and provide a set of correlation signals, the correlation signals having a first covariance matrix; and
   transforming the set of correlation signals with a correlation shaper, the correlation shaper adapted to provide a second set of signals, equal in number to the set of correlation signals, the second set of signals having a second covariance matrix and the second covariance matrix is proportional to an identity matrix on at least a subspace of the second covariance matrix.

9. The method of claim 8, wherein the transforming comprises a whitening transformation and includes substantially minimizing the mean squared error of the difference between the second set of signals and the set of correlation signals.

10. The method of claim 8, wherein the transforming includes substantially minimizing the mean squared error of the difference between the second set of signals and the set of correlation signals.

11. The method of claim 8, wherein the transforming comprises a subspace whitening transformation of the set of correlation signals.

12. The method of claim 11, wherein the transforming further comprises substantially minimizing a mean squared error of the difference between the second set of signals and the set of correlation signals.

13. A method of processing a received signal comprising:
   demodulating the received signal with plural correlators, the received signal being a combination of one or more predetermined signals $s_k$ and distortion;
   cross-correlating the received signal in each of plural correlators with one of a set of predetermined linearly independent signals $s_k$ to produce one of a set of correlation output signals $a_k$, wherein the produced set of correlation output signals has a positive-definite covariance matrix; and
   transforming the set of correlation output signals to a set of transformed output signals $b_k$ according to a whitening transformation W such that $$b = Wa$$

where a is a vector representation of the correlation output signals $a_k$ and b is a vector representation of the transformed output signals $b_k$ and W is a matrix defined by $$W = (S^*S)^{-1/2}$$

where the j,$k^{th}$ element of $S^*S$ is given substantially by the inner product of the predetermined signals $\langle S_j, S_k \rangle$.

14. A multi-signal receiver comprising:
a demodulator having plural correlators, each one of plural correlators cross-correlating a received signal with one of a set of predetermined linearly independent signals $S_k$ to produce one of a set of correlation output signals $a_k$, wherein
the received signal is a combination of one or more predetermined signals $S_k$ and distortion, and
the produced set of correlation output signals has a positive-definite covariance matrix; and
a correlation shaper, the correlation shaper operatively transforming the correlation output signals to a set of transformed output signals $b_k$ according to a whitening transformation W such that $$b=Wa$$

where a is a vector representation of the correlation output signals $a_k$ and b is a vector representation of the transformed output signals $b_k$ and W is a matrix defined by $$W=(S^*S)^{-1/2}$$

where the $j, k^{th}$ element of $S^*S$ is given substantially by the inner product of the predetermined signals $\langle S_j, S_k \rangle$.

15. A method of processing a received signal comprising:
demodulating the received signal with plural correlators, the received signal being a combination of one or more predetermined signals $S_k$ and distortion;
cross-correlating the received signal in each of plural correlators with one of a set of predetermined linearly dependent signals $S_k$ to produce one of a set of correlation output signals $a_k$; and
transforming the set of correlation output signals to a set of transformed output signals $b_k$ according to a subspace whitening transformation W such that $$b=Wa$$

where a is a vector representation of the correlation output signals $a_k$ and b is a vector representation of the transformed output signals $b_k$ and W is a matrix defined by $$W=((S^*S)^{1/2})\dagger$$

where the $j, k^{th}$ element of $S^*S$ is given substantially by the inner product of the predetermined signals $\langle S_j, S_k \rangle$ and $(\ )\dagger$ denotes the Moore-Penrose pseudo-inverse of the matrix.

16. A multi-signal receiver comprising:
a demodulator having plural correlators, each one of plural correlators cross-correlating a received signal with one of a set of predetermined linearly dependent signals $S_k$ to produce one of a set of correlation output signals $a_k$, wherein
the received signal is a combination of one or more predetermined signals $S_k$ and distortion; and
a correlation shaper, the correlation shaper operatively transforming the correlation output signals to a set of transformed output signals $b_k$ according to a subspace whitening transformation W such that $$b=Wa$$

where a is a vector representation of the correlation output signals $a_k$ and b is a vector representation of the transformed output signals $b_k$ and W is a matrix defined by $$W=((S^*S)^{1/2})\dagger$$

where the $j, k^{th}$ element of $S^*S$ is given substantially by the inner product of the predetermined signals $\langle S_j, S_k \rangle$ and $(\ )\dagger$ denotes the Moore-Penrose pseudo-inverse of the matrix.

17. A method of processing a received signal comprising:
demodulating the received signal with plural correlators, the received signal being a combination of one or more predetermined linearly independent signals $S_k$ and distortion;
cross-correlating the received signal in each of plural correlators with one of a set of orthogonal signals $q_j$ given substantially by $$q_j=\Sigma_k(W^*)_{jk}S_k$$

where $W^*$ is the adjoint of a matrix W, matrix W defined by $$W=(S^*S)^{-1/2}$$

where the $j, k^{th}$ element of $S^*S$ is given substantially by the inner product of the predetermined signals $\langle S_j, S_k \rangle$.

18. A method of processing a received signal comprising:
demodulating the received signal with plural correlators, the received signal being a combination of one or more predetermined linearly dependent signals $S_k$ and distortion;
cross-correlating the received signal in each of plural correlators with one of a set of projected orthogonal signals $q_j$ given substantially by $$q_j=\Sigma_k(W^*)_{jk}S_k$$

where $W^*$ is the adjoint of a matrix W, matrix W defined by $$W=((S^*S)^{1/2})\dagger$$

where the $j, k^{th}$ element of $S^*S$ is given substantially by the inner product of the predetermined signals $\langle S_j, S_k \rangle$ and $(\ )\dagger$ denotes the Moore-Penrose pseudo-inverse of the matrix.

* * * * *